United States Patent [19]

Liesener

[11] 4,116,587

[45] Sep. 26, 1978

[54] LOAD PLUS DIFFERENTIAL PRESSURE COMPENSATOR PUMP CONTROL ASSEMBLY

[75] Inventor: Kenneth P. Liesener, Joliet, Ill.

[73] Assignee: Caterpillar Tractor Co., Peoria, Ill.

[21] Appl. No.: 841,426

[22] Filed: Oct. 12, 1977

[51] Int. Cl.² .................... F04D 25/00; F16H 39/46
[52] U.S. Cl. ..................................... 417/212; 60/445; 60/452; 60/484
[58] Field of Search ................. 60/445, 451, 452, 484, 60/443; 417/212

[56] References Cited

U.S. PATENT DOCUMENTS

| | | | |
|---|---|---|---|
| 3,406,850 | 10/1968 | Hancox | 214/138 |
| 3,444,689 | 5/1969 | Budzich | 60/427 |
| 3,908,375 | 9/1975 | Young | 60/422 |
| 4,028,890 | 6/1977 | Habiger et al. | 60/445 X |
| 4,034,564 | 7/1977 | Johnson et al. | 60/451 X |
| 4,074,529 | 2/1978 | Budzich | 60/452 X |

Primary Examiner—Edgar W. Geoghegan
Attorney, Agent, or Firm—John W. Grant

[57] ABSTRACT

A first device for controlling the position of a displacement control member of a variable displacement pump has an actuator connected to the control member and a valve member which is movable between a first position at which a pump discharge pressure signal is in communication with the actuator and a second position at which said pump discharge pressure signal is blocked from communication with the actuator and the actuator is connected to a drain. The valve member has an end substantially continuously exposed to the pump discharge pressure signal and is responsive thereto for biasing the valve member toward one of the first and second positions. A spring apparatus biases the valve member toward the other of said positions in opposition to the biasing force of said pump discharge pressure signal and establishes a preselected minimum discharge pressure. A second device increases the biasing force of the spring apparatus for increasing the pump discharge pressure in response to a load pressure signal exceeding a preselected pressure level. The spring apparatus has a first spring positioned between the second device and the valve member and a second spring positioned between the housing and the valve member. The second spring biases the valve member toward said other position independently of the first spring for maintaining the pump discharge pressure at a preselected value above the load pressure signal only in response to the pump discharge pressure exceeding the preselected minimum discharge pressure level.

4 Claims, 3 Drawing Figures

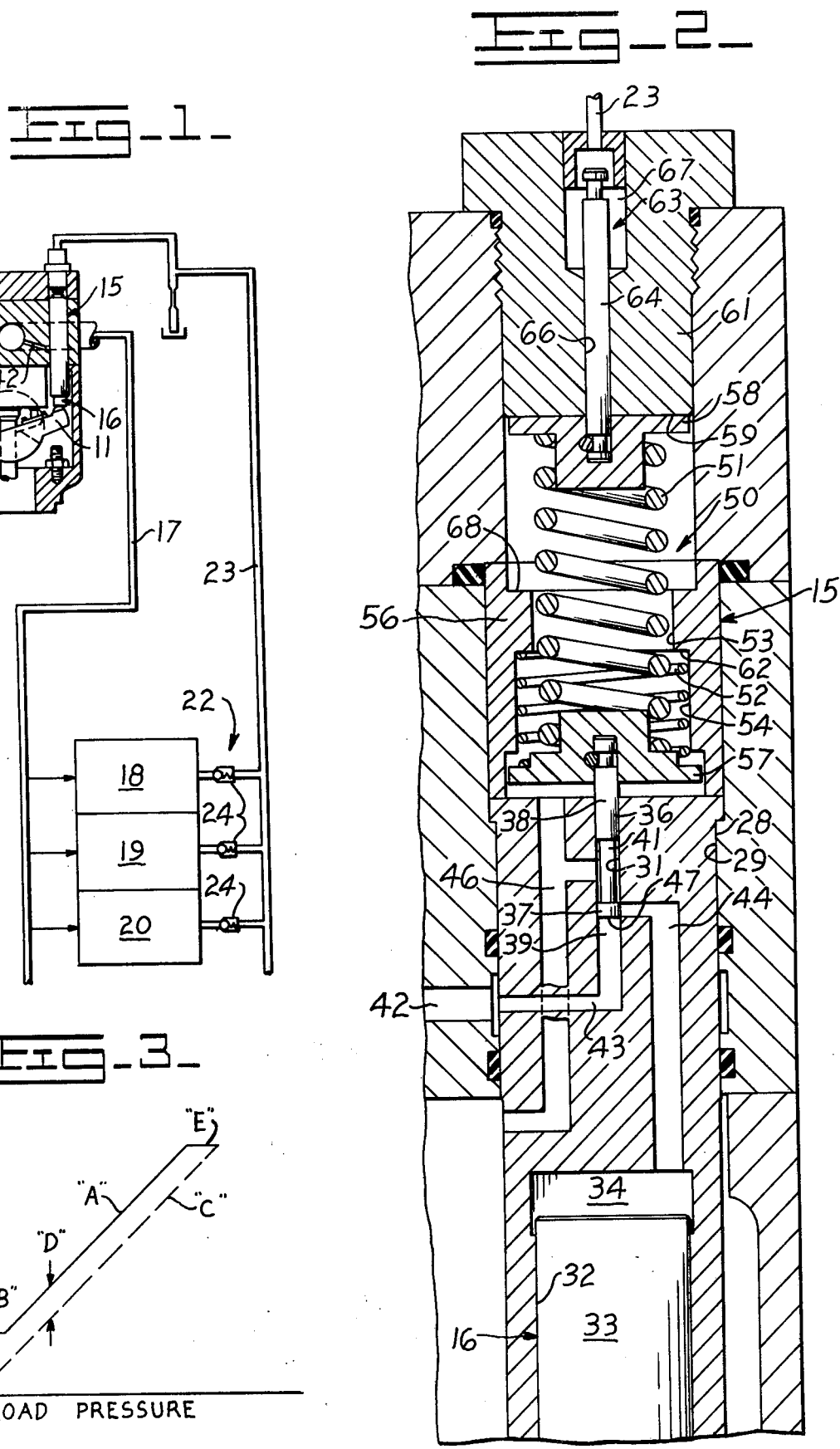

LOAD PLUS DIFFERENTIAL PRESSURE COMPENSATOR PUMP CONTROL ASSEMBLY

BACKGROUND OF THE INVENTION

This invention relates to a load plus pump control and more particularly to a pump control having a series-parallel bias spring assembly for controlling the pump discharge pressure.

In the control of a variable displacement pump having a movable swash plate for changing the displacement output, a pressure compensated pump control is often provided for urging the swash plate to a multiplicity of positions in response to a plurality of variables of the hydraulic system served by the pump. The pump control often includes a servo valve and a pump discharge cartridge means that interact through various movable elements to provide opposed urging forces on opposed ends of the swash plate for the controlled movement thereof. The urging forces are generally delivered by one or more springs and by fluid pressure at the discharge of the pump and one or more working elements.

One of the problems encountered with pressure compensated pump controls for variable displacement pumps is that the pump output is difficult to control when the pump discharge pressure is extremely low. Thus, it is desirable to maintain the pump discharge pressure above a minimum pressure level in order to have full control of the pump. It is also desirable to maintain the pump discharge pressure at a specified level above the required load pressure. This allows the pump to operate more efficiently over a large range of load pressures. If the difference is too great, excess energy is consumed in driving the pump while if the difference is too small, the pressure losses in the valves and lines between the pump and load might be greater than the "load-plus" difference and the pump efficiency is impaired.

SUMMARY OF THE INVENTION

The present invention is directed to overcoming one or more of the problems as set forth above.

According to the present invention, a pump control assembly for moving a displacement control member of a variable displacement pump between maximum and minimum discharge displacement positions has a first means for controlling the position of the control member. The first means has an actuating means connected to the control member and a valve member which has first and second end portions and is movable between a first position at which a pump discharge pressure signal is communicated to the actuating means and a second position at which said pump discharge pressure signal is blocked from communication with the actuating means and the actuating means is in communication with a drain. The first end portion of the valve member has an end being always exposed to said pump discharge pressure signal and being responsive thereto for biasing the valve member toward one of the first and second positions. A spring means biases the valve member toward the other of said positions in opposition to the biasing force exerted on the valve member by said pump discharge pressure signal and establishes a preselected minimum discharge pressure. A second means increases the biasing force of the spring means on the valve member for increasing the pump discharge pressure in response to a load pressure signal exceeding a preselected pressure level. The spring means has a first spring positioned between the second means and the second end portion of the valve member and a second spring positioned between the housing and the valve member. The second spring is constructed and positioned sufficient for biasing the valve member toward the other position independently of the first spring for maintaining said pump discharge pressure at a constant difference above the load pressure signal only after the pump discharge pressure exceeds the preselected minimum pressure level.

BRIEF DESCRIPTION OF THE DRAWINGS

FIG. 1 is a diagrammatic view of an example hydraulic system having the differential pressure compensator pump control of this invention;

FIG. 2 is a diagrammatic partial sectional view of the pump control; and

FIG. 3 is a graphical illustration of the pump discharge pressure/load pressure characteristics of the variable displacement pump utilizing the subject invention.

DETAILED DESCRIPTION

Referring to FIG. 1, a variable displacement pump 10 has a displacement control member or swash plate 11 that is movable between first and second positions for varying the discharge rate of the pump between maximum and minimum. The pump includes a means 12 having a movable actuator 13 and a spring 14 for biasing the swash plate in a first direction toward the maximum displacement output position and a means 15 for controlling the position of the swash plate and hence the pump discharge pressure in response to the pump discharge pressure and the load pressure. The means 15 has an actuating means 16 connected to the swash plate for biasing the swash plate to a reduced displacement output position.

Discharge of the pump 10 is delivered by a line 17 to a plurality of working elements 18, 19, 20, for the operation thereof. Means 22 is provided for sensing the operating pressure of the work elements and passing the largest of said pressures as a single load pressure signal through a line 23. The means 22 can be, for example, a plurality of check valves 24 commonly oriented and each being connected to a respective work element 18, 19, 20 and to line 23.

Such a pump control system is well known in the art and further description will be limited for purposes of brevity.

The means 15 as shown in FIG. 2 has a housing member 28 which is positioned within a bore 29 of the pump and has a pair of concentric bores 31, 32 therein. The actuating means 16 includes a piston 33 slidably positioned within the bore 32 forming an actuating chamber 34 at the closed end of the bore. A lower end of the piston is connected to the swash plate (FIG. 1). An elongated valve member 36 has first and second end portions 37, 38. The first end portion is slidably positioned within the bore 31 forming an actuating chamber 39 therein. A reduced diameter portion 41 is provided on the first end portion of the valve member.

The valve member 36 is movable between first and second positions. At the first position, a pump discharge pressure signal passes from a discharge passage through a passageway 42, a port 43 in the housing member connecting the passageway with the actuating chamber 39, and a port 44 connecting actuating chambers 39 and 34.

At the second position of the valve member, the pump discharge signal is blocked from communication with the port 44 and hence the actuating chamber 34 while the actuating chamber 34 is in communication with a drain port 46 via the port 44 and the reduced diameter portion 41. The pump discharge signal is always present in the actuating chamber 39 and thus is always exposed to an end 47 of the first end portion 37 of the valve member 36. Thus, fluid pressure acts on the effective area of the end 47 for biasing the valve member toward the first position.

A spring means 50 biases the valve member 36 toward the second position in opposition to the biasing force exerted on the valve member by the pump discharge signal in the actuating chamber 39 and establishes a preselected minimum discharge pressure of the pump.

The spring means 50 can be, for example, first and second compression springs 51, 52 concentrically positioned within bores 53, 54 in a housing member 56 positioned within the bore 29 of the pump. The first spring 51 is positioned between and has its opposite ends connected to first and second flanges or spring retaining elements 57, 58. The first retaining element is connected to the second end portion 38 of the valve member 36 while the second retaining element is positioned for abutment with a stop surface 59 of a housing member 61. The second spring has an end seated on the first spring retaining element 57 and its opposite end in abutment with an annular shoulder 62. In the assembled condition of the apparatus shown, both the first and second springs are maintained in a preloaded condition for biasing the valve member 36 toward the second position.

A means 63 is provided for increasing the biasing force of the first spring 51 on the valve member 36 to increase the pump discharge pressure in response to a load pressure signal in line 23 exceeding a preselected pressure level. The means 63 can be a load pressure piston 64 slidably positioned within a bore 66 in the housing member 61. One end of the piston is connected to the second spring retaining element 58 while the other end is positioned within an actuating chamber 67. Thus, the spring 51 is considered to be in series relationship between the load pressure piston and the valve member. The spring 52 acts in parallel to the spring 51. The line 23 is in continuous communication with the actuating chamber 67 for passing the load pressure signal into the actuating chamber. Movement of the second spring retaining element 58 toward the first spring retaining element 57 is limited by a stop 68 on the housing member 56.

Preferably, the diameter of the piston 64 is equal to the diameter of the first end portion 37 of the valve member 36. Thus, the effective area of the piston 64 exposed to the load pressure signal in the actuating chamber 67 is equal to the area of the end 47 of the valve member 36 exposed to the pump discharge pressure signal in the actuating chamber 39.

In operation of the apparatus, at start up, the spring 14 biases the swash plate 11 to the maximum displacement output position shown. With the fluid flow through line 17 blocked or otherwise restricted, operation of the pump causes the fluid pressure in the discharge passage and thus the actuating chamber 39 to increase sufficiently to overcome the force of the springs 51, 52 and move the valve member 36 toward the first position for communicating actuating chambers 39 and 34. The fluid passing from the actuating chamber 39 into the chamber 34 acts on the piston 33 which causes the piston to move the swash plate 11 to a reduced displacement position. The system will eventually balance with the biasing force exerted on the valve member 36 by the pump discharge pressure in the actuating chamber 39 being equal to the biasing force of the springs 51, 52.

When there is no demand on the pump, that is, if no load pressure signal is present in the line 23, the pump discharge pressure at the discharge passage will be maintained at a preselected minimum level as established by the combined biasing force of both springs 51, 52. The pump discharge pressure is represented by the line "A" on the graph of FIG. 3 with the minimum discharge pressure level represented at point "B".

From this balanced position, if the fluid demand of the working elements 18, 19, 20 increases, an increased load signal is delivered by line 23 to the actuating chamber 67. The load pressure signal is indicated by the broken line "C" on the graph of FIG. 3. Initially, the load pressure signal in the actuating chamber 67 is insufficient to overcome the bias of the spring 51 and thus the pump discharge pressure will be maintained at the minimum pressure as the load pressure signal increases until the load pressure reaches a preselected pressure level. At this time, the increased load pressure signal drives the piston 64 toward the valve member 36 which exerts a commonly directed force on the valve member through the spring 51 causing the valve member to be moved downwardly toward its second position. At the second position, communication between chambers 39 and 34 is blocked while the chamber 34 is communicated with the drain port 46. This allows the spring 14 and the inherent swivel torques to bias the swash plate 12 toward the maximum displacement position in response to the increased load thereby causing the pump discharge pressure to increase proportional to the amount of increase in the load pressure signal.

As set forth above, the area of the piston 64 acted on by the load pressure signal in actuating chamber 67 is substantially equal to the area of the end 47 of the valve member 36 acted on by the discharge pressure in the actuating chamber 39. The second spring 52 provides a load plus function by exerting a substantially constant force on the valve member 36 independently of the force exerted by the first spring 51 and the piston 64. Thus, the pump discharge pressure is always above the load pressure and once the pump discharge pressure exceeds the preselected minimum pressure level, the pressure differential between the pump discharge pressure and the load pressure remains substantially constant throughout the higher pressure ranges. This pressure differential is represented at "D" on the graph of FIG. 3.

When the load pressure increases sufficiently, the retaining element 58 contacts the stop 68 on housing member 56, thereby preventing further movement of the load piston 64 toward the valve member 36 and thus limits the maximum biasing force exerted on spring 51 by load piston 64. This in turn establishes the maximum pump discharge pressure. This maximum discharge pressure is represented at point "E" on the graph of FIG. 3.

Alternatively, in some variable displacement pumps, the means 12 and 15 can be positioned wherein the actuator 13 and spring 14 biases the swash plate 11 toward the minimum displacement output position. The means 15 continues to control the position of the swash plate and hence the pump discharge pressure in response to the pump discharge pressure and the load pressure. In those pumps, the construction of valve member 36 and the position of the related ports from the discharge passage and the actuating chambers 34, 36 is also altered so that the valve member is biased to the position at which the pump discharge signal is blocked from communication with the actuating means 16 and the actuating means is in communication with the drain port 46 in response to the pump discharge pressure signal acting on the end 47 of the valve member.

Other aspects, objects and advantages of this invention can be obtained from a study of the drawings, the disclosure and the appended claims.

The embodiments of the invention in which an exclusive property or privilege is claimed are defined as follows:

1. In a pump control assembly for moving a displacement control member of a variable displacement pump between maximum and minimum discharge displacement positions, said assembly having first means for controlling the position of the control member, said first means having an actuating means connected to the control member and a valve member positioned within a housing and having first and second end portions, said valve member being movable between a first position at which a pump discharge pressure signal is in communication with the actuating means and a second position at which said pump discharge pressure signal is blocked from communication with the actuating means and the actuating means is in communication with a drain, said first end portion of the valve member having an end substantially continuously exposed to said pump discharge pressure signal and being responsive thereto for biasing the valve member toward one of the first and second positions, the improvement comprising:

spring means for biasing the valve member toward the other of said positions in opposition to the biasing force exerted on the valve member by said pump discharge pressure signal for establishing a preselected minimum discharge pressure;

second means for increasing the biasing force of the spring means on the valve member for increasing the pump discharge pressure in response to a load pressure signal exceeding a preselected pressure level; and said spring means having a first spring positioned between the second means and the valve member, and a second spring positioned between the housing and the valve member, said second spring being of a construction and position sufficient for biasing the valve member toward said other position independently of the first spring and maintaining said pump discharge pressure at a preselected value above the load pressure signal only in response to the pump discharge pressure exceeding the preselected minimum discharge pressure level.

2. Apparatus as set forth in claim 1, wherein said second means includes a chamber in the housing, a piston having one end positioned within the chamber and its other end in abutment with the first spring and a line communicating said load pressure signal with the chamber.

3. Apparatus as set forth in claim 2, wherein said piston is substantially equal in diameter to said end of the valve member.

4. Apparatus as set forth in claim 1, including a bore and an annular shoulder in the housing, said second spring being positioned within the bore with said second spring being in abutment with the annular shoulder.

* * * * *